(12) United States Patent
Wells et al.

(10) Patent No.: US 8,265,588 B2
(45) Date of Patent: Sep. 11, 2012

(54) DEVICE AND METHOD FOR TEMPERATURE MONITORING AND WARNING

(75) Inventors: Andrew K. Wells, Grayslake, IL (US); David M. Boldt, Arlington Heights, IL (US); Gregory R. Black, Vernon Hills, IL (US)

(73) Assignee: Motorola Mobility LLC, Libertyville, IL (US)

( * ) Notice: Subject to any disclaimer, the term of this patent is extended or adjusted under 35 U.S.C. 154(b) by 152 days.

(21) Appl. No.: 12/772,369

(22) Filed: May 3, 2010

(65) Prior Publication Data
US 2010/0330950 A1 Dec. 30, 2010

Related U.S. Application Data

(60) Provisional application No. 61/221,395, filed on Jun. 29, 2009.

(51) Int. Cl.
*G08B 17/00* (2006.01)
*H04W 4/22* (2009.01)

(52) U.S. Cl. ............. 455/404.1; 455/343.1; 455/572; 340/584

(58) Field of Classification Search ............ 455/404.1, 455/343.1, 572; 340/584
See application file for complete search history.

(56) References Cited

U.S. PATENT DOCUMENTS

| | | | |
|---|---|---|---|
| 5,164,652 A | 11/1992 | Johnson et al. | |
| 5,237,257 A | 8/1993 | Johnson et al. | |
| 5,534,765 A | 7/1996 | Kreisinger et al. | |
| 5,717,307 A | 2/1998 | Barkat et al. | |
| 5,815,807 A | 9/1998 | Osmani et al. | |
| 6,677,860 B2 | 1/2004 | DelRossi et al. | |
| 6,760,311 B1 | 7/2004 | Raith | |
| 6,789,205 B1 | 9/2004 | Patino et al. | |
| 6,894,459 B2 | 5/2005 | Howard et al. | |
| 7,206,567 B2 | 4/2007 | Jin et al. | |
| 7,233,127 B2 | 6/2007 | Chen et al. | |
| 2002/0093311 A1 | 7/2002 | Stryker et al. | |

(Continued)

FOREIGN PATENT DOCUMENTS

EP 1883143 B1 12/2009

OTHER PUBLICATIONS

IEEE LIVIUM 1725; IEEE Standard for Rechargeable Batteries for Cellular Telephones; IEEE Std 1725—2006; 82 pages.

(Continued)

*Primary Examiner* — Jinsong Hu
*Assistant Examiner* — Jean Chang
(74) *Attorney, Agent, or Firm* — Gary J. Cunningham

(57) ABSTRACT

A wireless communication device and method adapted for temperature monitoring and warning is disclosed. In its simplest form, it can include: providing (510) a multi-mode communication device including an unrestricted mode having an unrestricted operation temperature range and a restricted mode having a restricted operation temperature range; determining (520) if a temperature in proximity to an energy storage device is in at least one of the restricted operation temperature range and the unrestricted operation temperature range; periodically entering (530) the restricted mode when in the restricted operation temperature range and entering the unrestricted mode when in the unrestricted operation temperature range; and entering (540) the unrestricted mode when a user attempts to make an emergency call. Advantageously, this method allows safe battery operation, while allowing a user to make emergency calls.

19 Claims, 6 Drawing Sheets

U.S. PATENT DOCUMENTS

| | | | |
|---|---|---|---|
| 2004/0048143 | A1 | 3/2004 | Stumpf |
| 2005/0101287 | A1 | 5/2005 | Jin et al. |
| 2005/0288051 | A1 | 12/2005 | Van Bosch |
| 2007/0009125 | A1* | 1/2007 | Frerking et al. .............. 381/315 |
| 2008/0057984 | A1 | 3/2008 | Willey |
| 2011/0116427 | A1* | 5/2011 | Chang et al. .................. 370/311 |

OTHER PUBLICATIONS

U.S. Appl. No. 12/129,724, filed May 30, 2008; "Device and Method to Prolong the Life of an Energy Source"; 18 pages.

U.S. Appl. No. 12/610,087, filed Oct. 30, 2009; "Device and Method for Temperative Monitoring and Warning"; 25 pages.

PCT Search Report; Corresponding U.S. Appl. No. 12/129,724; Dec. 18, 2009; 11 pages.

Patent Cooperation Treaty, International Search Report and Written Opinion of the International Searching Authority for International Application No. PCT/US2010/037869, Sep. 6, 2010, 12 pages.

"The International Search Report and the Written Opinion of the International Searching Authority", completed: Aug. 25, 2010, mailed: Aug. 31, 2010, all pages.

* cited by examiner

DEVICE AND METHOD FOR TEMPERATURE MONITORING AND WARNING

BACKGROUND

1. Field

The present disclosure relates to a device and method for temperature monitoring and/or warning in an electronic device.

2. Introduction

Mobile devices are expected to operate over a broad operating temperature range of, for example, from $-10°$ C. to $+60°$ C. or higher. Likewise, rechargeable energy storage components used in mobile devices have a corresponding specified operating temperature range. Mobile devices, such as wireless communication devices, have become essential to daily living, and operation at temperatures outside of this temperature range may be required in some circumstances. For example the use of the mobile device to communicate with emergency serviced i.e. emergency calling, is expected over an extended temperature range. Operating outside of the specified temperature range is a challenge for rechargeable energy storage components, because such operation can cause reduced energy storage capacity and reduced number of recharging cycles. Energy storage device manufacturers have attempted to address this challenge by allowing limited operation over a wider range of temperatures.

Thus, there is a need for a method and device for providing a means to help the device user to avoid operating the device outside of the operating temperature range, and providing a limited extended temperature range operation including emergency calling, and prolonging the useful life of an energy storage device in electronic devices, such as wireless communication devices.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
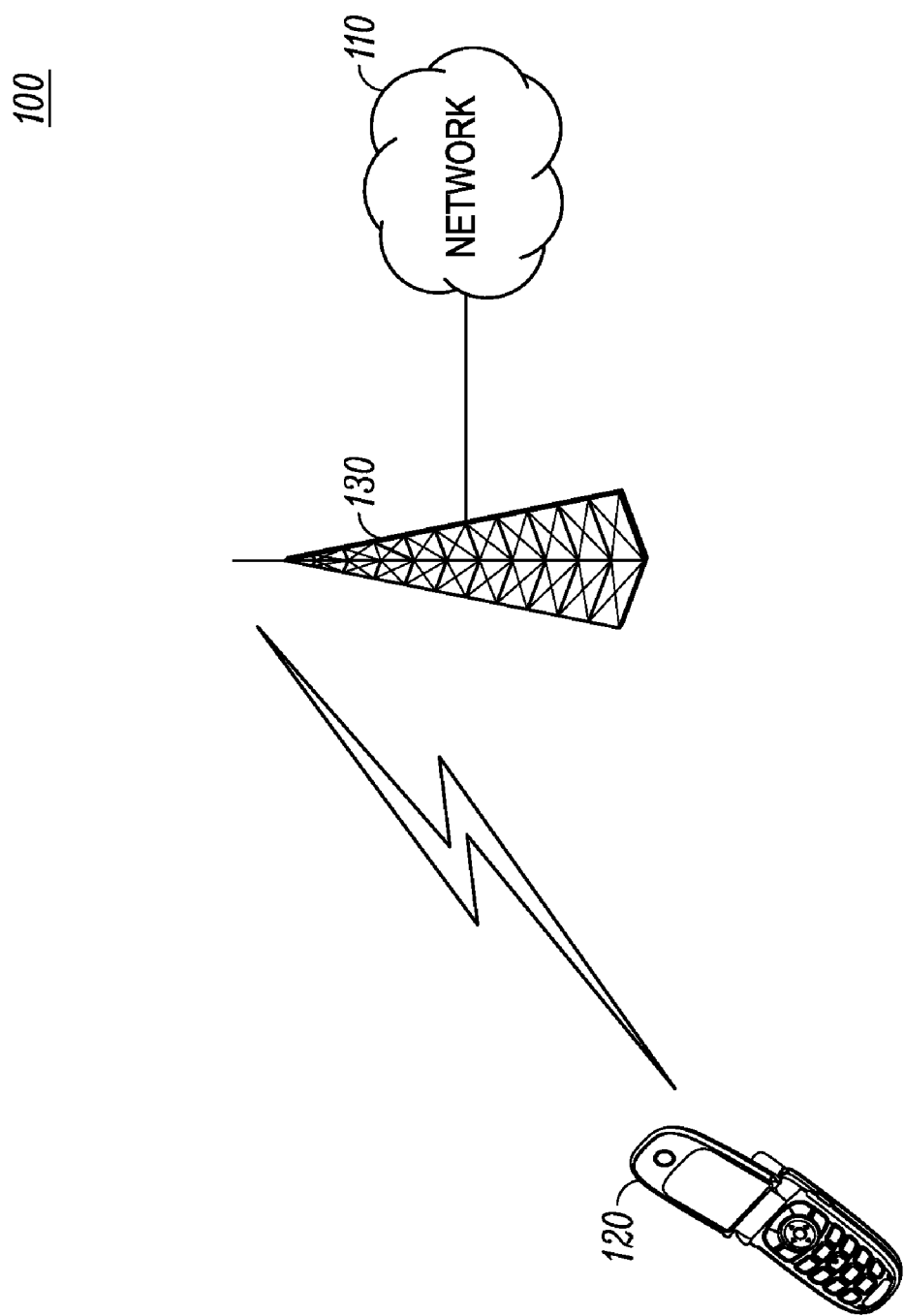
FIG. 1 is an exemplary block diagram of a communication system according to one embodiment.

FIG. 1 is an exemplary block diagram of a system 100 according to one embodiment. The system 100 can include a network 110, a terminal 120, and a base station 130. The terminal 120 may be a wireless communication device, such as a wireless telephone, a cellular telephone, a personal digital assistant, a pager, a personal computer, a selective call receiver, or any other device that is capable of sending and receiving communication signals on a network including wireless network. The network 110 may include any type of network that is capable of sending and receiving signals, such as wireless signals. For example, the network 110 may include a wireless telecommunications network, a cellular telephone network, a Time Division Multiple Access (TDMA) network, a Code Division Multiple Access (CDMA) network, a Third Generation (3G) network, a satellite communications network, and other like communications systems. Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals. In operation, the terminal 120 can communicate with the network 110 and with other devices on the network 110 by sending and receiving wireless signals via the base station 130.

Figure 2:
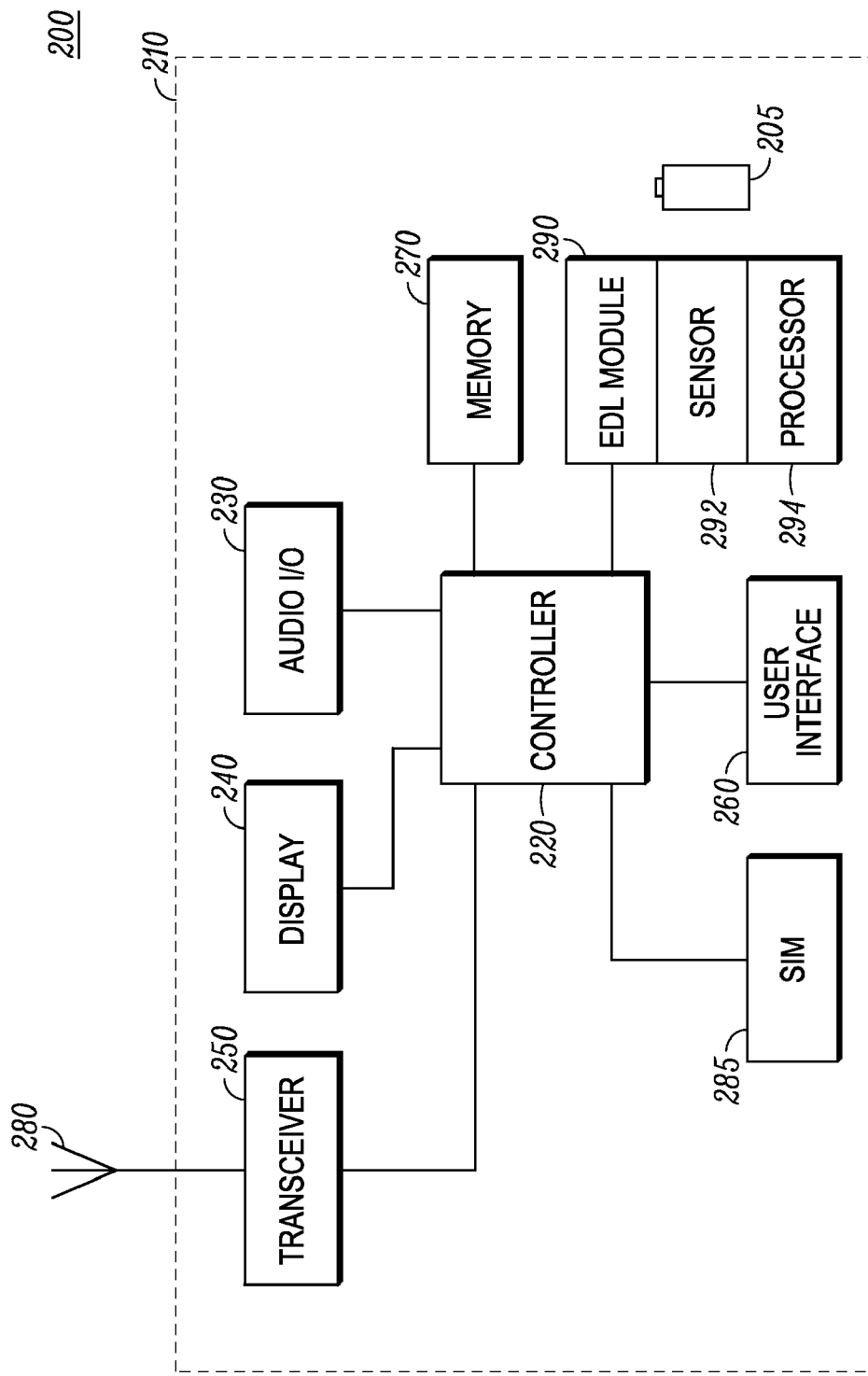
FIG. 2 is an exemplary block diagram of a wireless communication device for temperature monitoring and/or warning according to one embodiment.

FIG. 2 is an exemplary block diagram of a wireless communication device 200 configured with an energy storage device 205, such as the terminal 120, according to one embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, an antenna 280 coupled to the housing 210 and a transceiver 250, and a removable subscriber identity module 285 coupled to the controller 220. The wireless communication device 200 further includes an energy discharge limiting module 290 configured to identify an energy storage device, to sense a threshold temperature in proximity to the energy storage device and to adjust a discharge energy rate in response to the identified energy storage device and sensed threshold temperature. In one embodiment, the module 290 includes a sensor 292 and processor module 294, which are coupled to the controller 220. In more detail, the module 290 can reside within the controller 220, can reside within the memory 270, can be autonomous modules, can be software, can be hardware, or can be in any other format useful for a module on a wireless communication device 200.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory or any other memory that can be coupled to a wireless communication device.

In more detail, the wireless communication device 200 shown in FIG. 2, includes: a housing 210; a controller 220 coupled to the housing 210, the controller 220 configured to control the operations of the wireless communication device; memory 270 coupled to the controller 220; memory 270 coupled to the controller 220; a transceiver 250 coupled to the controller 220; and an energy discharge limiting module 290 configured to identify an energy storage device 205, to sense a threshold temperature in proximity to the energy storage device 205 and to adjust a discharge energy rate in response to the identified energy storage device 205 and sensed threshold temperature.

In its simplest form, the wireless communication device is configured with an energy storage device 205. It can include: a housing 210; a controller 220 coupled to the housing, the controller 220 configured to control the operations of the wireless communication device; a transceiver 250 coupled to the controller 220; and an energy discharge limiting module 290 configured to determine a limit temperature discharge energy rate, to sense a temperature range threshold in proximity to the energy storage device and to adjust a discharge energy rate in response to the determined temperature discharge rate and sensed temperature range threshold.

Advantageously, the module 290 can automatically and dynamically manage current drain of an energy storage device 205 when a certain temperature range threshold is reached to maintain the device within desired specifications and tolerances. This can prolong the useful life of the energy storage device 205 and help to maintain a maximum recharging capacity.

In one embodiment, the energy discharge limiting module 290 is configured to adjust and lower the discharge energy rate, below a pre-adjusted discharge energy rate, when outside of the temperature range. For example a battery may be specified to be rechargeable 100 times to an energy level of C mA-hours, provided that it is operated within a temperature range of −10° C. to +60° C., or with a limited current drain of C/10 mA within an extended temperature range. Discharging the battery above the limit current drain while outside of the operating temperature range causes reduced energy storage capacity and a reduced number of recharging cycles. Thus when temperature is outside of the temperature range, either above or below, the discharge limiting module 290 lowers the discharge energy rate to below C/10 mA, in one embodiment. The device is thereby operable over an extended temperature range, albeit with reduced functionality. Note that energy discharge rate actually has units of power, which is the product of current and voltage. However it is customary to specify energy discharge rate from a battery as a current, since the battery voltage level is also specified.

In more detail, energy storage devices, such as 205, have a specified limit temperature discharge energy rate. In one arrangement, the energy discharge limiting module 290 can be configured to adjust the discharge energy rate to below the specified limit temperature discharge energy rate by controlling operation of the wireless communication device 200. In a preferred embodiment, a limit temperature discharge rate is determined by identifying the energy storage device and looking up a specified limit temperature discharge energy rate in at least one of an internal memory and an external data base, the energy discharge limiting module being configured to adjust the discharge energy rate to below the specified limit temperature discharge energy rate. The wireless communication device 200 has configurable features and modes, each requiring power from the energy storage device. For a given configuration the total power required for the enabled features and modes may exceed the specified limit temperature discharge energy rate of the energy storage device 205. However, for a configuration enabling only the most essential or prioritized features and modes, the required power drain is less than the limit temperature discharge energy rate of the energy storage device 205. Non-essential or non-prioritized features and modes may be disabled when the temperature is outside of the specified temperature range of the energy storage device 205. The device is thereby operable for essential operations over the extended temperature range of the energy storage device 205, and since the energy drain is below the limit temperature energy discharge limit there is minimal or no reduction in capacity or number of potential charging cycles.

Since the disabling of features and modes serves to lower the device power consumption it has the effect of reducing the device temperature. Thus it is beneficial to take power consumption reducing measures as the temperature approaches the specified operating range temperature threshold. A warning mode may be initiated when temperature exceeds a threshold that is below the upper specified operating temperature range threshold. Thus, a device may enter a warning mode wherein the user is warned of impending operation outside of the specified operating temperature range.

The warning may consist of a flashing alert or a descriptive display or the like. It may further include a dialog with the user in which measures for reducing power consumption are suggested. Warning mode power reduction measures may be user controlled, by opening a dialog with the user, and requesting inputs as to which energy saving measures to perform, and thereby avoiding the need for entering a mode in which features are automatically disabled due to the temperature having exceeded the operating temperature range threshold.

If the battery temperature continues rising and exceeds the specified operating temperature, then automatic power reducing measures will become necessary in a restricted operation mode.

If the battery temperature rises further, above the specified operating temperature, it may be advantageous for the device to completely turn off or shut-down which may occur instantly upon reaching a level above the specified operating temperature, i.e. a shut-down threshold. Alternatively or turn-off may occur a warning period.

Importantly, entering restricted mode or shutting down must not occur if an emergency call is on-going. Likewise, if the restricted mode includes restricted communications, a means must be provided for the user to enter the unrestricted mode to establish an emergency call. Furthermore, if the device is shut-down due to battery temperature exceeding a shut-down threshold the user should be able to restart the device and operate in unrestricted mode for sufficient time to make an emergency call.

In a preferred embodiment, the energy storage device 205 includes a specified energy capacity C Ampere-hours, and the specified limit temperature discharge energy rate is C/10 Amperes. As should be understood by those skilled in the art, the discharge energy rate can very widely depending on the energy storage device 205 and device it is used in connection therewith. The capacity C for Li-Ion batteries used for mobile phones is, typically, in the range of 500 mA-hours to 2.5 A-hours. The energy drain of mobile phone devices may vary from a few mA to over 1 Amp depending on the device capabilities and configuration. (Note that it is common to use current drain as measure of power, assuming a battery voltage of 3.6V, as is understood in the art.)

The energy discharge limiting module can be configured to: (i) limit an application to a lower discharge energy rate below a pre-adjusted discharge energy rate; (ii) reconfigure the wireless communication device to a lower discharge energy rate below a pre-adjusted discharge energy rate; (iii) change a network registration to a different power class wireless communication device to a lower discharge energy rate below a pre-adjusted discharge energy rate; (iv) change a network registration to a different data rate class wireless communication device to a lower discharge energy rate below a pre-adjusted discharge energy rate; and (v) temporarily disable lower priority applications to provide a lower discharge energy rate below a pre-adjusted discharge energy rate; and (vi) reduce functionality or shut down a user interface device, or reduce a device illumination level. As should be understood, other examples can be utilized as well.

In connection with item i above, shutting down or limiting an application to a lower discharge energy rate below a pre-adjusted discharge energy rate may involve disabling applications or adjusting the operating parameters within applications. In an audio player application, for example, the entire application may be disabled, or player modes having to do with input media or file type or output signal paths may be disabled, or parameters such as output signal amplitude may be limited. Applications such as video players and webbrowsers may be entirely disabled or may be disabled only for certain media or file input types, or parameters such as display brightness or lighting may be limited. Applications involving data communications may be entirely disabled, or may be disabled for applications involving large amounts of data, in situations where receiver conditions are unfavorable for low power reception, or where the transmitter output power requirement is high, or parameters such as bandwidth and power may be limited. Limiting an application may involve reducing communication with an application server such as reducing the amount of data exchanged or increasing a data synchronization time interval.

In connection with item ii, reconfiguring the wireless communication device to a lower discharge energy rate below a pre-adjusted discharge energy rate may involve limiting the available communication modes. For example a multimode device capable wide area network (WAN), local area network (LAN) and personal area network (PAN) capabilities may be reconfigured to enable only the most essential of these, typically the WAN. In the case of devices capable of operation on multiple simultaneous communication networks the number of available networks may be reduced. In this way the power drain from the battery cause by simultaneous WAN, LAN or PAN operations is reduced, and the power drain is limited to power drain from, for example, a single WAN. Many devices already provide an RF emissionless mode, called "airplane mode", for the purpose of using the device on an airplane. In airplane mode all wireless communications are disabled. Importantly, the user must retain the ability to re-establish communication capability for the purpose of emergency calling. Thus, if a device employs the airplane mode for the purpose of reducing battery discharge when operating outside of the specified temperature range, a means must be provided to change back to an unrestricted mode for the purpose of emergency calling. This may involve a user dialog which is triggered by the dialing of an emergency calling number such as 911 or 112.

In connection with item iii, changing a network registration to a different power class wireless communication device to a lower discharge energy rate below a pre-adjusted discharge energy rate causes a reduction in maximum RF output power of the transmitter and a corresponding limitation in power drain from the battery. For example, a cellular device may be capable of transmitting at 2 watts of output power, corresponding to a GSM power class IV capability. During normal temperature range operation the device registers on the GSM network as a power class IV device, such that in data transferring or voice calling application the network controls the device to transmit up to 2 Watts. At extreme temperatures the device may register on the GSM network as a power class V device, such that the network controls the device to transmit at up to 800 m Watts. In this way the transmitter maximum output power may be reduced which causes a corresponding reduction in power drain from the transmitter and thereby causes a limiting of the power drain from the battery.

In connection with item iv, changing a network registration to a different data rate class wireless communication device to a lower discharge energy rate below a pre-adjusted discharge energy rate causes a reduction in maximum power drain in the radio transmitter and the receiver and a corresponding limitation in power drain from the battery. For example, a cellular device may be capable of a highest data rate corresponding to a modulation and coding scheme 9 (MCS-9). During normal temperature range operation it registers on the cellular network as an MCS-9 device. At extreme temperatures the device may register a lower data rate capability such as MCS-1, such that the network controls the device to transmit and receive data at a lower maximum rate. The lower data rate operation requires less transmitter and receiver processing capability and correspondingly lower power drain in radio transmitter and receiver, and thereby causes a limiting of power drain from the battery.

In connection with item v, temporarily disabling lower priority applications to provide a lower discharge energy rate below a pre-adjusted discharge energy rate may involve disabling non-essential features, modes, programs, or services. Some examples of reception of non-essential broadcast data, can include AM or FM radio or television, media players for entertainment, games, etc. This causes a reduction in power drain in the broadcast receivers, microprocessors, displays and audio circuits, for example, employed by the device 200 to implement these applications. In this way the power drain from the battery corresponding to these applications is limited.

And in connection with item vi, reducing the functionality of or shutting down a user interface device such as a display, touch-screen or keypad, or reducing a device illumination level, this involves disabling power consuming user interface functions, except for those needed to execute the essential applications on the device.

In another arrangement, the energy discharge limiting module 290 can be configured to identify and provide a specification detailing the temperature dependent discharge limit for the energy storage device. For example, this can be done by identifying the battery type. Battery type information may include the manufacturer, manufacturer part number, capacity information from the manufacturer, measured capacity, temperature range or threshold, extreme temperature discharge rate, etc. Assuming just a battery part number is identified, a corresponding specification may be determined from non-volatile memory in the device, or by requesting that information from an external data base. For example, a battery part number may be identified by querying the battery, and the temperature limit and discharge rate limit may then be looked up in a data base.

The energy discharge limiting module 290 can be configured to identify and authenticate the energy storage device 205, as being acceptable for use in the wireless communication device. This can be done by generating and sending a random number challenge to the battery, encoding the random number with a proprietary encryption method, receiving a response from the battery, and if the response matches the encoded random number the battery is determined to be authentic. In this way the battery can be determined as being from a trusted supplier, and the identified or determined battery specification, is validated.

The energy storage device 205 can include at least one of: a battery, a fuel cell, a fuel container and an electrochemical capacitor. In a preferred embodiment, it is a battery such as, a lithium ion cell or a nickel metal anhydride cell, such cells having reasonably large energy capacity, wide operating temperature range, large number of charging cycles, and long useful life. For a lithium ion battery cell the operating temperature range may be −10° C. to 60° C. For a nickel metal anhydride cell the temperature range may be wider, for example −20° C. to +75° C. For a hydrogen fuel cell it may be considerably narrower, for example 0° C. to +45° C. Even with a given cell technology there may be differences in the temperature range specified by the cell supplier. In some cases the temperature range may be unbounded on the lower or upper temperature limit. For example, a lithium ion cell supplier may only specify an upper operating temperature range of 60° C. Thus there may be significant differences in the operating temperature range of the energy storage device 205.

In one arrangement, one or more signal indicators are provided for alerting a user that operation outside if a temperature range has been detected. For example: if a battery temperature exceeding a level slightly below the specified operating temperature, e.g. 55 C, is detected a warning mode indicator may be triggered; if the specified battery operating temperature, e.g. 60 C, is detected a restricted operation mode indicator may be triggered indicating that energy discharge limiting module has been triggered; and if the temperature exceeds a level significantly above operating temperature limit, e.g. 65 C, then a shut-down warning may be triggered prior to shut-down. The indicator may comprise a display or banner and may include descriptive symbols or text. Examples can include and are not limited to a visual signal, audible signal and tactile activity. The indicator may further comprise a user dialog.

In one embodiment, a data bus configured for conveying at least one of energy storage device identification data and a limit temperature discharge energy rate data from the energy storage device to the energy discharge limiting module 290 is provided. The identification data is then used to look-up the battery specification including an extreme temperature energy discharge rate limit. Preferably, the data bus is further configured to convey temperature threshold detection data from the energy storage device 205 to the energy discharge limiting module 290. Alternatively, the temperature and the extreme temperature energy discharge rate limit could be conveyed directly from the energy storage device 205 to the energy discharge limiting module 290 over the data bus.

Figure 3:
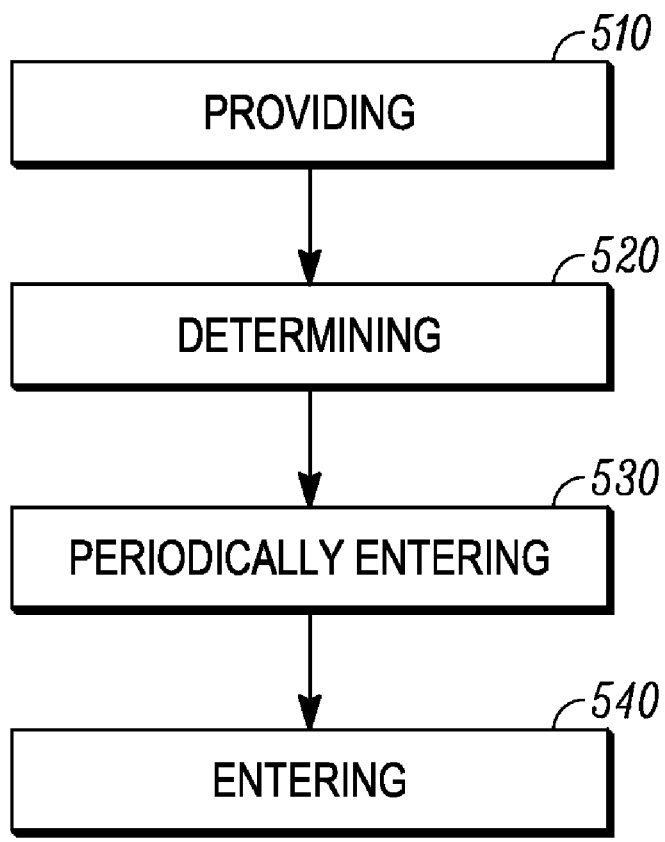
FIG. 3 is an exemplary block diagram of a wireless communication method for temperature monitoring and/or warning according to one embodiment.

Referring to FIG. 3, a wireless communication method 500 is shown. It can include: providing 510 a multi-mode communication device including an unrestricted mode having an unrestricted operation temperature range and a restricted mode having a restricted operation temperature range; determining 520 if a temperature in proximity to an energy storage device is in at least one of the restricted operation temperature range and the unrestricted operation temperature range; periodically entering 530 the restricted mode when in the restricted operation temperature range and entering the unrestricted mode when in the unrestricted operation temperature range; and entering 540 the unrestricted mode when a user attempts to make an emergency call. In a preferred embodiment, the periodically entering step 530 involves entering the restricted mode only at periodic intervals. If the restricted mode includes restricted communications the periodic interval provides a necessary delay during which emergency calls can be made (whereas the entering step 540 should involve minimal delay). Advantageously, this method allows safe battery operation, while allowing a user to make emergency calls.

In one embodiment, the providing step 510 includes a shut-down mode having a shut-down operation temperature range, the determining step includes determining if the temperature in proximity to the energy storage device is in the shut-down operation temperature range, and the periodically entering step includes shutting down when in the shut down temperature range, wherein when powering up the device, the device enters the unrestricted mode. Advantageously, in the event a user powers down and then powers back up, the user enters the unrestricted mode at power up, with sufficient time to allow emergency calls. Similarly, the periodicity or sampling period detailed herein, allows a user to make or receive any other type of non-emergency call for a limited time after power up.

In another embodiment, the providing step 510 includes a warning mode having a warning operation temperature range, the determining step includes determining if the temperature in proximity to the energy storage device is in the warning operation temperature range, and the periodically entering step includes entering the warning mode when in the warning operation temperature range. Advantageously, the warning operation temperature range may be slightly below the restricted operating temperature range, allowing the user to reconfigure the device for lower power drain from the battery, and thereby avoid entering the restricted mode.

The method 500 can further include the step of refraining from entering the restricted mode if the device is in an emergency call. Beneficially, this feature allows a caller to continue with or complete an emergency call. Similarly, the refraining step can include refraining from entering the restricted mode for a predetermined time, after the restricted mode has been entered. Alternative the method can be arranged such that the predetermined delay begins after an emergency call has been terminated. This feature allows emergency personnel to call a user for a predetermined period of time.

In more detail and in one embodiment, a wireless communication method 500 can include: providing 510 a multi-mode communication device including an unrestricted mode having an unrestricted operation temperature range, a warning mode having a warning operation temperature range, a restricted mode having a restricted operation temperature range, and a shut-down mode having a shut-down temperature range; determining if a temperature in proximity to an energy storage device is in at least one of the unrestricted operation temperature range, the warning operation temperature range, the restricted operation temperature range, and the shut-down operation temperature range; periodically entering the unrestricted mode when in the unrestricted operation temperature range, the warning mode when in the warning operation temperature range, the restricted mode when in the restricted operation temperature range, and the shut-down mode when in the shut-down operation temperature range; and entering the unrestricted mode when a user attempts to make an emergency call and refraining to enter the restricted mode when in an emergency call Referring back to FIG. 2, in one embodiment, the wireless communication device 200 can include: a housing 210; a controller 220 coupled to the housing, the controller configured to control the operations of the wireless communication device, the wireless communication device including a multi-mode communication device including an unrestricted mode having an unrestricted operation temperature range and a restricted mode having a restricted operation temperature range; a transceiver 250 coupled to the controller 220; and an energy module 290 configured to determine if a temperature in proximity to an energy storage device is in at least one of the restricted operation temperature range and the unrestricted operation temperature range; periodically enter the restricted mode when in the restricted operation temperature range and enter the unrestricted mode when in the unrestricted operation temperature range; and enter the unrestricted mode when a user attempts to make an emergency call. Advantageously, the invention allows safe battery operation, while allowing a user to make emergency calls.

In one arrangement, the energy module 290 is configured with a shut-down mode having a shut-down operation temperature range and configured to determine if the temperature in proximity to the energy storage device 205 is in the shut-down operation temperature range, and periodically shut down when in the shut-down temperature range, wherein when powered up the wireless communication device enters the unrestricted mode. Also, the energy module 290 can be configured to refrain from entering the restricted mode if the wireless communication device is in an emergency call for a predetermined time, after an emergency call has been terminated, as detailed previously.

In more detail, in one embodiment, the wireless communication device 200 can include: a housing 210; a controller 220 coupled to the housing, the controller configured to control the operations of the wireless communication device, the wireless communication device including a multi-mode communication device including an unrestricted mode having an unrestricted operation temperature range, a warning mode having a warning operation temperature range, a restricted mode having a restricted operation temperature range, and a shut-down mode have a shut-down temperature range; a transceiver 250 coupled to the controller 220; and an energy module 290 configured to determine if a temperature in proximity to an energy storage device is in at least one of the unrestricted operation temperature range, the warning operation temperature range, the restricted operation temperature range, and the shut-down operation temperature range; enter the unrestricted mode when in the unrestricted operation temperature range, enter the warning mode when in the warning operation temperature range, periodically enter the restricted mode when in the restricted operation temperature range, and periodically enter the shut-down mode when in the shut-down operation temperature range; and enter the unrestricted mode when a user attempts to make an emergency call. Advantageously, the invention allows safe battery operation, while allowing a user to make emergency calls.

In a preferred embodiment, the controller periodically enters the restricted mode when the temperature is in the restricted operation and periodically enters the shut-down mode when the temperature is in the shutdown range. This feature provides a delay, depending on the periodicity, for the device to remain in unrestricted mode for the user to make an emergency call if necessary.

The device 200 can further include a signal indicator for alerting a user that a change in modes is about to occur or has occurred. For example an indicator can alert that the device is in warning mode, restricted mode, or shut down mode. The alert can include a dialog for querying the user as to how the device should be optionally configured in these modes.

Figure 4:
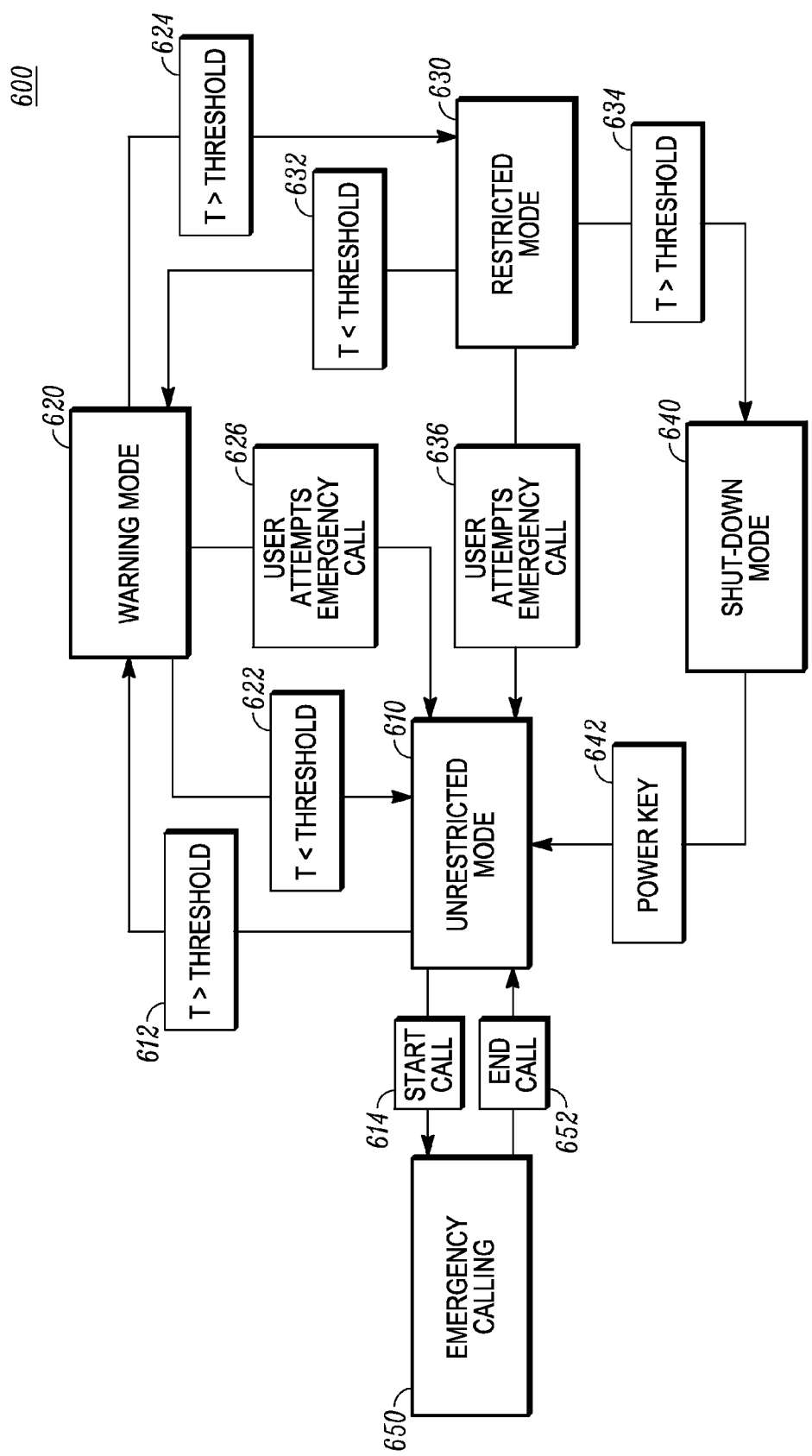
FIG. 4 is an exemplary state machine in connection with a wireless communication method for temperature monitoring and/or warning according to one embodiment.

FIG. 4 is a state diagram 600 of one embodiment of the invention. Beginning in shut-down mode 640, power-up may occur by the user activating a power key 642. Other power-up means are possible such as by connecting a charger. The device powers up in the unrestricted mode 610. In unrestricted mode 610, the user may start an emergency call 614 which puts the device in an emergency calling state 650, from which if the call ends 652, the state returns to the unrestricted mode 610. In unrestricted mode 610, if the temperature of the battery exceeds a threshold 612, such as the warning operating temperature range, the state goes to the warning mode 620. When in warning mode 620, if the temperature of the battery goes below a threshold 622, such as the unrestricted operating temperature range, the state goes back to the unrestricted mode 610. When in warning mode 620, if the temperature of the battery exceeds a threshold 624, such as the restricted operating temperature range, the state goes to the restricted mode 630. Note that restricted mode 630 may include restrictions on communications, and mode transition into the restricted mode, such as 624, must occur periodically to allow sufficient dwell time in the warning mode 620 (or in the unrestricted mode 610 if there is no warning mode) for a user to make an emergency call, even when the temperature is in the restricted operating temperature range. When in restricted mode 630, if the temperature of the battery goes below a threshold 632, such as the warning operating temperature range, the state goes back to the warning mode 620. When in restricted mode 630, if the battery temperature exceeds a threshold 634, such as the shut-down temperature range, the state goes to the shut down mode and the device shuts down. Shut down may occur after a delay, to allow an orderly shutdown of applications and to warn the user.

Referring again to FIG. 3, a wireless communication method 500 can include: providing 510 a multi-mode communication device including an unrestricted mode having an unrestricted operation temperature range, a restricted mode having a restricted operation temperature range and a warning mode having a warning operation temperature range; determining 520 if a temperature in proximity to the energy storage device is in at least one of the restricted operation temperature range, the unrestricted operation temperature range and a warning operation temperature range; and entering 540 the warning mode when in the warning operation temperature range, wherein the warning mode includes a notification, banner or the like, to a user to suggest that at least one active application be shut down.

Advantageously, this method allows the user an opportunity to manually configure the device for lower power drain for the battery, and thereby avoid entering the restricted mode. In this way the user can keep an important application running which would otherwise be turned off automatically. For example, if restricted mode includes disabling game applications, and the user is playing a game, then upon receiving or hearing the warning mode alert, he or she may choose to disable something unrelated to the game, such as communications, thereby avoiding having to stop the game, or the user may choose to employ a power saving measure which does not affect the game in the particular circumstances at that time. The method 500 can provide a warning notification including at least one of a visual signal, audible signal and tactile activity, which may be configurable depending on circumstances. For example, if a user is occupied in a gaming application she may prefer a simple audible alert in order to avoid being distracted. On the other hand, if the user is using the device primarily for data communications, the user may prefer a detailed interaction with the device involving allowing the user to choose which power saving measures to implement, from a visible list.

In one embodiment, a display is provided with suggestions to a user for lowering power consumption based on applications currently running in the device. A list of running applications and corresponding power consumptions can be provided. Additionally, power savings from power reduction measures such as disabling backlights, or turning off of the display, or disabling certain communication modes such as local area network modes, can be provided.

In a preferred embodiment, a user can manually or the device 200 can automatically lower power consumption based on one or more applications currently running in the device. A list of applications and power saving measures may be provided in the warning mode. The user may then select which applications to disable, and which power saving measures to enable. The actual enabling and disabling may occur when the user selects them in warning mode, or they may occur only if the device heats up further and enters restricted mode. In this way the warning mode alert may provide an impetus for the user to manual reduce the power drain of the device, or to configure the power saving methods which may be subsequently enacted automatically when the device enters the restricted mode.

Referring back to FIG. 2, in one embodiment, the wireless communication device 200 with an energy storage device 205, can include: a housing 210; a controller 220 coupled to the housing 210, the controller 220 configured to control the operations of the wireless communication device, the wireless communication device 200 including a multi-mode communication device including an unrestricted mode having an unrestricted operation temperature range, a restricted mode having a restricted operation temperature range and a warning mode having a warning operation temperature range; a transceiver 250 coupled to the controller 220; and an energy module 290 configured to determine if a temperature in proximity to the energy storage device 205 is in at least one of the restricted operation temperature range, the unrestricted operation temperature range and a warning operation temperature range; and enter the warning mode when in the warning operation temperature range, wherein the warning mode includes a notification to a user to suggest that at least one active application be shut down. In this way the user is alerted to high power drain of the device which may lead to the battery temperature exceeding an operational temperature limit.

Figure 5:
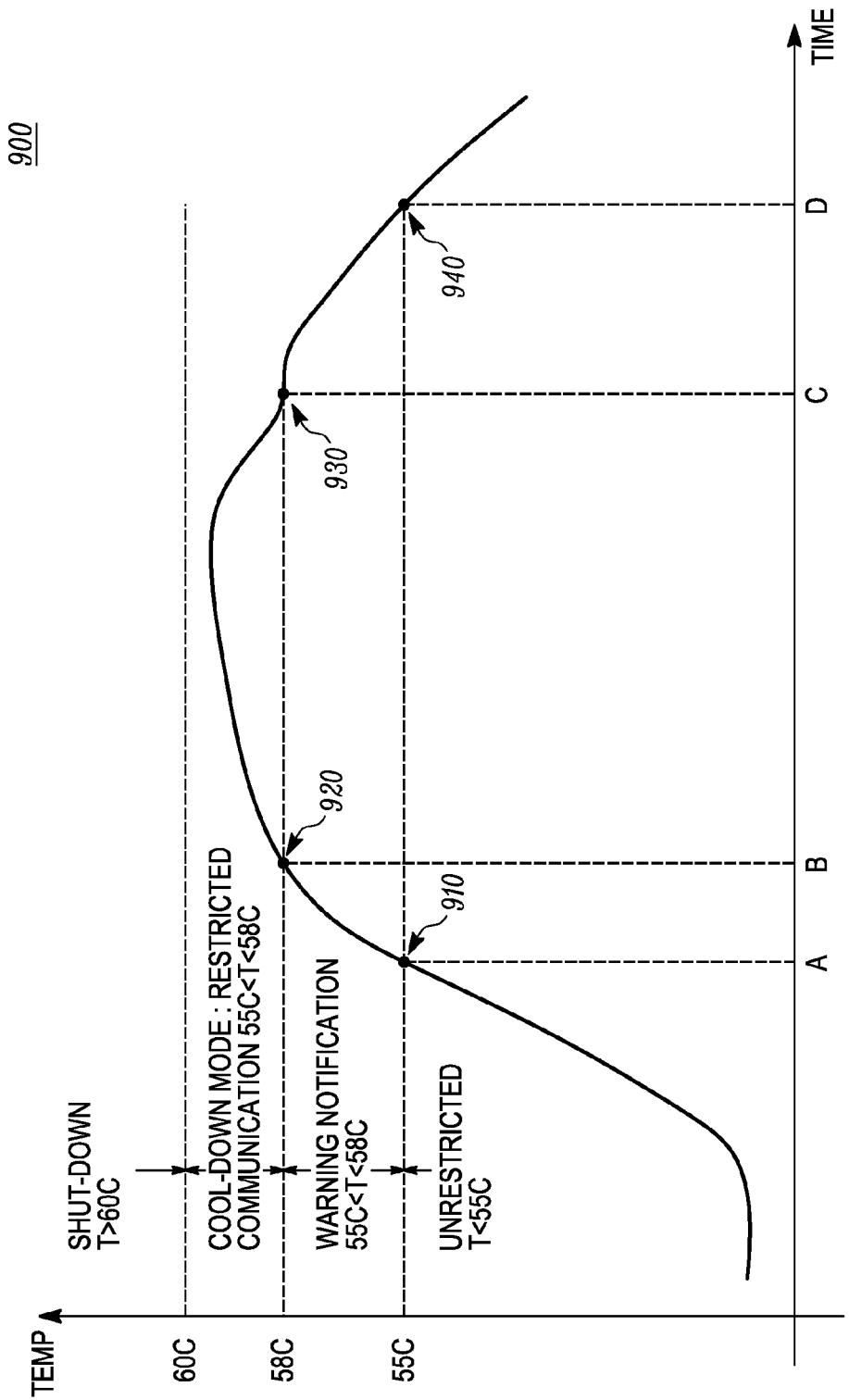
FIG. 5 is an exemplary temperature versus time graph in connection with a wireless communication method for temperature monitoring and/or warning according to one embodiment.

In FIG. 5, a timing diagram 900, illustrates an embodiment, with various operational modes and corresponding temperature ranges, with temperature shown on a vertical axis and time on a horizontal axis. In more detail, temperature range entering is shown invoking different modes and notifications.

When the temperature of the device increases and reaches 55 degrees C. from a normal temperature zone, shown at item 910 in FIG. 5, one warning notification is shown or displayed to suggest to a user to close some active applications. For example, in the event a user is presently in a phone call and a simultaneous data session, a notification may show a list of active communications, and the corresponding power drain, along with other application current drain, and power saving measures, and the user may choose to end the call or the data session, disable an application, or enable a power saving measure. If the temperature continues to increase and reaches 58 degrees C., as shown at item 920, the wireless communication device can enter a cool-down mode, i.e. a restriction operation mode, and a notice can be shown. In one embodiment, in the cool-down mode, restricted communication can automatically be invoked, for example, as well as other power saving measures such as display backlight dimming. If the temperature increases over 60 degrees (not shown), the wireless communication device can be forced into Deep Sleep mode or shut down. After the temperature declines and reaches 58 degrees C. at item 930, an alert notification can be shown to tell users that the phone operation is again unrestricted and a warning notice may be shown such as what was shown at item 910. Alternatively this can be achieved with a delay. After the temperature declines further, and reaches 55 degrees C., the user may receive notice that the device has entered into the normal temperature zone i.e. the unrestricted mode. Note that the mode threshold may be lower when the temperature is declining than when the temperature is increasing, so as to avoid rapid switching between modes due to small temperature fluctuations. Alternatively this can be achieved with delay.

Figure 6:
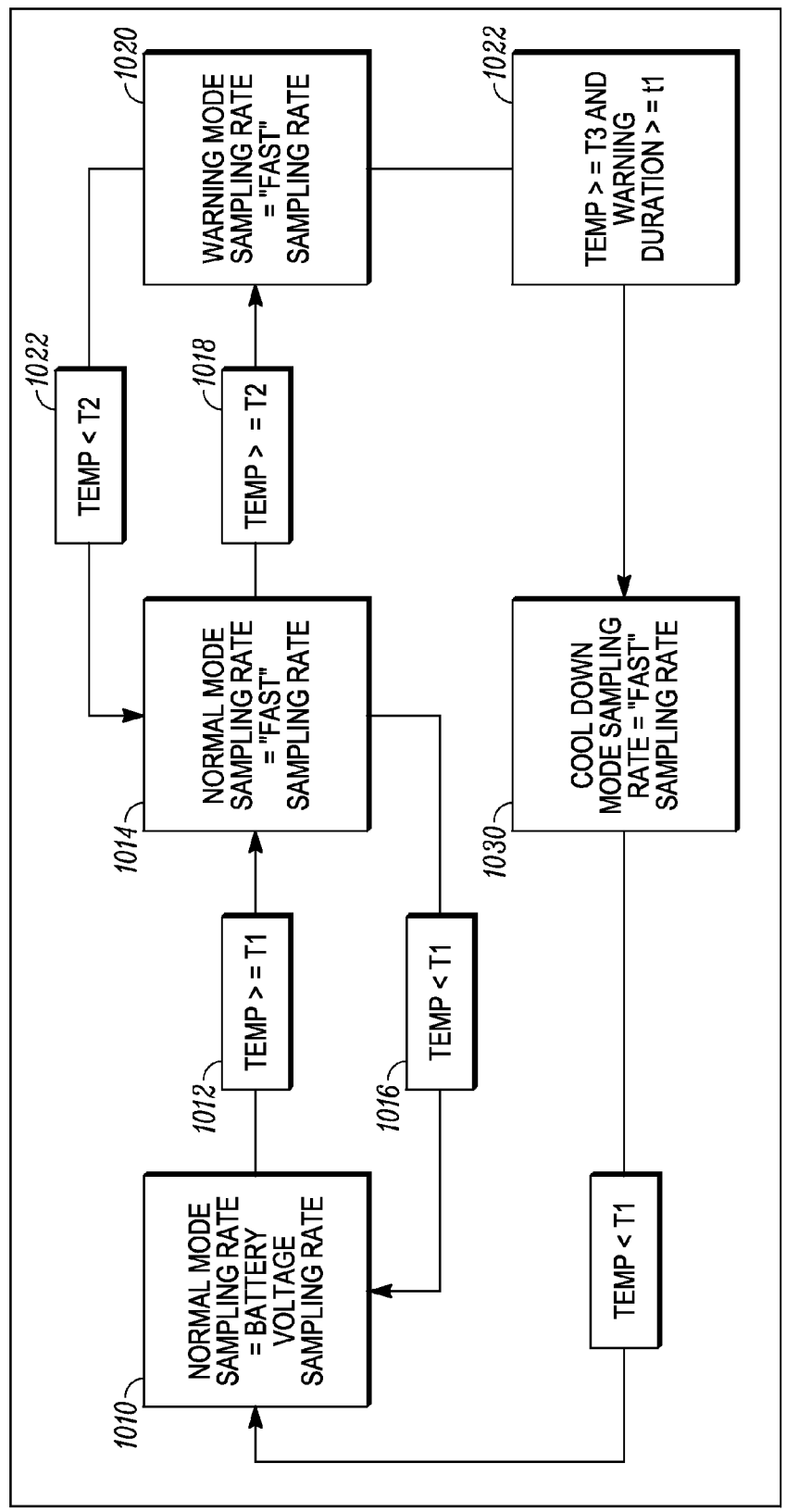
FIG. 6 is an exemplary state machine in connection with a wireless communication method for temperature monitoring and/or warning according to one embodiment.

In FIG. 6, a detailed energy storage temperature state diagram, such as for a battery, is shown. In more detail, FIG. 6 shows the transition of the different modes based on battery temperature for one embodiment. A first unrestricted operation mode is the normal battery voltage sampling rate 1010. Upon detection of temperature in excess of T1, the state changes to the normal mode with fast sampling rate 1012. Upon detection of temperature below T1, the state changes to the normal mode with fast sampling rate 1012. In this example, T1 is 50 C. This is the temperature which is close to the warning mode threshold temperature, for which more frequent temperature samples are required. In this way, the temperature is sampled with sufficient frequency to ensure timely detection of the temperature exceeding T2, at box 1018, at which time the state changes to the warning mode 1020. In this example T2=55 C. Upon detection of the temperature exceeding T3, if the warning mode duration has exceeded a predetermined time, t1, in box 1022, the state changes to the cool down mode 1030. In this example, T3 is 58 C and t1 is 3 minutes. If the device is in the warning mode, at box 1020 or the cool down mode and a user attempts to make an emergency call, the state changes to normal mode with fast sampling 1014 (not shown). In this way, the device may enable power saving measures which may include communication restrictions, but only after sufficient time has elapsed to allow a user to make an emergency call.

The device 200 and method 500 are preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises,"

"comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A wireless communication method, comprising:
providing a multi-mode communication device including an unrestricted mode having an unrestricted operation temperature range and a restricted mode having a restricted operation temperature range;
determining if a temperature in proximity to an energy storage device is in at least one of the restricted operation temperature range and the unrestricted operation temperature range;
periodically entering the restricted mode when in the restricted operation temperature range and entering the unrestricted mode when in the unrestricted operation temperature range; and
entering the unrestricted mode when a user attempts to make an emergency call,
wherein the providing step includes a shut-down mode having a shut-down operation temperature range, the determining step includes determining if the temperature in proximity to the energy storage device is in the shut-down operation temperature range, and the periodically entering step includes periodically shutting down when in the shut down temperature range, and wherein when powering up the device, the device enters the unrestricted mode.

2. The wireless communication method of claim 1, further comprising refraining from entering the restricted mode for a predetermined time upon power up.

3. The wireless communication method of claim 1, further comprising refraining from entering the restricted mode if the device is in an emergency call.

4. The wireless communication method of claim 1, further comprising refraining from entering the restricted mode for a predetermined time, after an emergency call has been terminated.

5. A wireless communication method, comprising:
providing a multi-mode communication device including an unrestricted mode having an unrestricted operation temperature range and a restricted mode having a restricted operation temperature range; and
determining if a temperature in proximity to an energy storage device is in at least one of the restricted operation temperature range and the unrestricted operation temperature range;
periodically entering the restricted mode when in the restricted operation temperature range and entering the unrestricted mode when in the unrestricted operation temperature range; and
entering the unrestricted mode when a user attempts to make an emergency call and refraining from entering the restricted mode if the device is in an emergency call,
wherein the providing step includes providing a shut-down mode having a shut-down operation temperature range, the determining step includes determining if the temperature in proximity to the energy storage device is in the shut-down operation temperature range, and the periodically entering step includes periodically shutting down when in the shut down temperature range, and wherein when powering up the device, the device enters the unrestricted mode.

6. The wireless communication method of claim 5, wherein the providing step includes upon powering up the unrestricted mode for a predetermined time.

7. The wireless communication method of claim 5, wherein the refraining step includes refraining from entering the restricted mode for a predetermined time, after the emergency call has been terminated.

8. The wireless communication method of claim 5, wherein the refraining step includes refraining from entering the restricted mode for a predetermined time, after entering the unrestricted mode.

9. The wireless communication method of claim 5, wherein the periodically entering step includes changing modes only at the times that a mode timer expires.

10. The wireless communication method of claim 5, wherein the entering step includes a dialog requesting user confirmation to enter the unrestricted mode when the user attempts to make an emergency call.

11. A wireless communication device configured with an energy storage device, comprising:
a housing;
a controller coupled to the housing, the controller configured to control the operations of the wireless communication device, the wireless communication device including a multi-mode communication device including an unrestricted mode having an unrestricted operation temperature range and a restricted mode having a restricted operation temperature range;
a transceiver coupled to the controller; and
an energy module configured to determine if a temperature in proximity to an energy storage device is in at least one of the restricted operation temperature range and the unrestricted operation temperature range; periodically enter the restricted mode when in the restricted operation temperature range and enter the unrestricted mode when in the unrestricted operation temperature range; and enter the unrestricted mode when a user attempts to make an emergency call,
wherein the energy module is configured with a shut-down mode having a shut-down operation temperature range and configured to determine if the temperature in proximity to the energy storage device is in the shut-down operation temperature range and periodically shut-down when in the shut down temperature range, and wherein when powered up the wireless communication device enters the unrestricted mode.

12. The wireless communication device of claim 11, wherein the energy module is configured upon power up to enter the unrestricted mode for a predetermined time.

13. The wireless communication device of claim 11, wherein the energy module is configured to refrain from entering the restricted mode if the wireless communication device is in an emergency call.

14. The wireless communication device of claim 11, wherein the energy module is configured to refrain from entering the restricted mode for a predetermined time, after an emergency call has been terminated.

15. The wireless communication device of claim 11, wherein the energy module is configured to refraining from entering the restricted mode for a predetermined time, after entering the unrestricted mode.

16. The wireless communication device of claim 11, wherein the energy storage device includes at least one of: a battery, a fuel cell, a fuel container and an electrochemical capacitor.

17. The wireless communication device of claim 11, further comprising a signal indicator for alerting a user that a change in modes is about to occur or has occurred.

18. The wireless communication device of claim 11, further comprising a mode timer configured to periodically enter the restricted mode when in the restricted operation temperature range and enter the unrestricted mode when in the unrestricted operation temperature range when the mode timer expires.

19. The wireless communication method of claim 11, further comprising a dialog display for requesting user confirmation to enter the unrestricted mode when the user attempts an emergency call.

* * * * *